United States Patent
Ko et al.

(10) Patent No.: US 10,737,473 B2
(45) Date of Patent: Aug. 11, 2020

(54) TRANSPARENT FILM FOR FLOORING AND FLOORING COMPRISING SAME

(71) Applicant: LG HAUSYS, LTD., Seoul (KR)

(72) Inventors: Hae-Seung Ko, Anyang-si (KR); Woo-Kyung Jang, Cheonan-si (KR)

(73) Assignee: LG HAUSYS, LTD., Seoul (KR)

( * ) Notice: Subject to any disclaimer, the term of this patent is extended or adjusted under 35 U.S.C. 154(b) by 119 days.

(21) Appl. No.: 15/546,976

(22) PCT Filed: Jan. 11, 2016

(86) PCT No.: PCT/KR2016/000240
§ 371 (c)(1),
(2) Date: Jul. 27, 2017

(87) PCT Pub. No.: WO2016/122137
PCT Pub. Date: Aug. 4, 2016

(65) Prior Publication Data
US 2018/0015704 A1  Jan. 18, 2018

(30) Foreign Application Priority Data
Jan. 28, 2015 (KR) .......... 10-2015-0013790

(51) Int. Cl.
| | | |
|---|---|---|
| *C08L 27/06* | (2006.01) | |
| *C08L 33/12* | (2006.01) | |
| *B32B 27/08* | (2006.01) | |
| *B32B 27/30* | (2006.01) | |
| *B32B 27/36* | (2006.01) | |
| *B32B 19/04* | (2006.01) | |
| *B32B 27/06* | (2006.01) | |
| *B32B 19/06* | (2006.01) | |
| *B32B 27/18* | (2006.01) | |
| *B32B 5/26* | (2006.01) | |
| *B32B 9/02* | (2006.01) | |
| *B32B 27/22* | (2006.01) | |
| *B32B 21/04* | (2006.01) | |
| *B32B 7/04* | (2019.01) | |
| *B32B 21/08* | (2006.01) | |
| *B32B 5/22* | (2006.01) | |
| *B32B 27/12* | (2006.01) | |
| *B32B 21/10* | (2006.01) | |

(52) U.S. Cl.
CPC ............ *B32B 27/08* (2013.01); *B32B 5/22* (2013.01); *B32B 5/26* (2013.01); *B32B 7/04* (2013.01); *B32B 9/02* (2013.01); *B32B 19/04* (2013.01); *B32B 19/042* (2013.01); *B32B 19/045* (2013.01); *B32B 19/06* (2013.01); *B32B 21/04* (2013.01); *B32B 21/08* (2013.01); *B32B 21/10* (2013.01); *B32B 27/06* (2013.01); *B32B 27/12* (2013.01); *B32B 27/18* (2013.01); *B32B 27/22* (2013.01); *B32B 27/30* (2013.01); *B32B 27/304* (2013.01); *B32B 27/308* (2013.01); *B32B 27/36* (2013.01); *C08L 27/06* (2013.01); *C08L 33/12* (2013.01); *B32B 2255/10* (2013.01); *B32B 2255/26* (2013.01); *B32B 2260/021* (2013.01); *B32B 2260/026* (2013.01); *B32B 2260/04* (2013.01); *B32B 2262/0261* (2013.01); *B32B 2262/0269* (2013.01); *B32B 2262/0276* (2013.01); *B32B 2262/067* (2013.01); *B32B 2262/101* (2013.01); *B32B 2262/14* (2013.01); *B32B 2264/067* (2013.01); *B32B 2264/102* (2013.01); *B32B 2264/104* (2013.01); *B32B 2270/00* (2013.01); *B32B 2307/30* (2013.01); *B32B 2307/304* (2013.01); *B32B 2307/3065* (2013.01); *B32B 2307/412* (2013.01); *B32B 2307/536* (2013.01); *B32B 2307/546* (2013.01); *B32B 2307/584* (2013.01); *B32B 2307/714* (2013.01); *B32B 2307/732* (2013.01); *B32B 2307/734* (2013.01); *B32B 2333/12* (2013.01); *B32B 2419/04* (2013.01); *C08L 2201/10* (2013.01)

(58) Field of Classification Search
CPC ...... C08L 27/06; C08L 33/12; C08L 2201/10; B32B 2250/04; B32B 2250/05
See application file for complete search history.

(56) References Cited

U.S. PATENT DOCUMENTS

| | | | | |
|---|---|---|---|---|
| 5,547,741 A | * | 8/1996 | Wilson ............ | C08L 27/06 428/215 |
| 2008/0206535 A1 | * | 8/2008 | Grigo ............ | C08J 5/08 428/220 |
| 2011/0147120 A1 | * | 6/2011 | Smith ............ | B32B 5/18 181/294 |

(Continued)

FOREIGN PATENT DOCUMENTS

| | | |
|---|---|---|
| JP | 08-259762 A | 10/1996 |
| KR | 10-2007-0105869 A | 10/2007 |

(Continued)

OTHER PUBLICATIONS

Fakhreia Al-Sagheer et al., Stabilizing poly(vinyl cholride) using its blends with poly (methyl methacarylate): Pyrolysis GC/MS studies, Journal of Hazardous Materials, Jun. 2014, pp. 584-591, Kuwait.

(Continued)

*Primary Examiner* — Karuna P Reddy
(74) *Attorney, Agent, or Firm* — Hauptman Ham, LLP

(57) ABSTRACT

The present invention relates to a transparent film for flooring comprises a polyvinyl chloride resin and a polymethyl methacrylate (PMMA) resin.

9 Claims, 1 Drawing Sheet

(56) References Cited

U.S. PATENT DOCUMENTS

2015/0337542 A1\* 11/2015 Cappelle ................ E04F 15/10
52/309.13

FOREIGN PATENT DOCUMENTS

| KR | 10-2010-0051495 A | 5/2010 |
| KR | 10-2014-0100686 A | 8/2014 |
| WO | 2013/097890 A1 | 7/2013 |
| WO | WO2013097890 A1 \* | 7/2013 |

OTHER PUBLICATIONS

Korean Office Action dated Nov. 15, 2018, in connection with the Korean Patent Application No. 10-2015-0013790.
International Search Report dated Apr. 18, 2016 corresponding to International Application No. PCT/KR2016/000240.

\* cited by examiner

TRANSPARENT FILM FOR FLOORING AND FLOORING COMPRISING SAME

CROSS-REFERENCE TO RELATED APPLICATIONS

This application is a National Phase Application of PCT International Application No. PCT/KR2016/000240, which was filed on Jan. 11, 2016, and which claims priority from Korean Patent Application No. 10-2015-0013790 filed with the Korean Intellectual Property Office on Jan. 28, 2015. The disclosures of the above patent applications are incorporated herein by reference in their entirety.

TECHNICAL FIELD

The present invention relates to a transparent film for flooring and flooring comprising the same.

BACKGROUND ART

In general, flooring includes a sheet, a papered floor, a tile, etc., used mainly for finishing floors of buildings such as a building, a house, etc., provides a hygienic space by blocking dust and cold air from a cement floor, and has various patterns printed thereon, and thus, it is possible to exhibit decorative effects such as changing an indoor atmosphere according to customer's taste, etc.

Generally, when the flooring has a print layer and a transparent film layer formed thereon, there are many cases in which total volatile organic compounds (hereinafter referred to as "TVOCs") are released above the reference value. In particular, in a universally used PVC tile, an emission amount of TVOCs is much higher than 0.10 mg/m²·h regarding the provisions of environmentally friendly building materials. Accordingly, an interest in environmentally friendly flooring in which the emission amount of TVOCs is reduced has increased day by day.

The flooring is required to have a predetermined level of mechanical strength so as to be widely used in residential or commercial use, and also is required to have hardness on a surface of a product so that scratches, etc., do not occur by daily use. Therefore, abrasion performance of the transparent film layer applied to the flooring is directly related to a lifespan of the product. There is a limitation in complementing the strength of the flooring only by adjusting a thickness of the transparent film layer.

DISCLOSURE

Technical Problem

It is an aspect of the present invention to provide a transparent film for flooring having excellent surface strength and scratch resistance while simultaneously implementing clear appearance.

It is another aspect of the present invention to provide flooring including a transparent film layer formed of the transparent film for flooring.

Technical Solution

In accordance with one aspect of the present invention, a transparent film for flooring includes: a polyvinyl chloride resin; and a polymethyl methacrylate (PMMA) resin.

A weight ratio of the polyvinyl chloride resin to the polymethyl methacrylate resin may be 20:1 to 2:1.

The transparent film for flooring may include 50 wt % to 95 wt % of the polyvinyl chloride resin.

The transparent film for flooring may include 0.1 wt % to 50 wt % of the polymethyl methacrylate resin.

The polymethyl methacrylate resin may have a weight average molecular weight (Mw) of 50,000 g/mol to 150,000 g/mol.

The polymethyl methacrylate resin may have a glass transition temperature of 85° C. to 115° C.

The polymethyl methacrylate resin may have a melt index according to ASTM1238 of 10 g/10 min to 25 g/10 min.

The transparent film for flooring may further include: at least one selected from the group consisting of a plasticizer, a lubricant, a processing aid, and a combination thereof.

The transparent film may have a thickness of 0.05 mm to 1.5 mm.

In accordance with another aspect of the present invention, flooring includes: a transparent film layer formed of the transparent film for flooring as described above.

The flooring may further include: at least one layer selected from the group consisting of a surface treatment layer, a print layer, a dimensionally stable layer, a white layer, a base layer, a balance layer, and a combination thereof.

The base layer may be a fiber reinforced base layer.

The flooring may have a stacked structure of the transparent film layer/a print layer/a white layer/a base layer; or a stacked structure of a surface treatment layer/the transparent film layer/a print layer/a white layer/a base layer; or a stacked structure of the transparent film layer/a print layer/a white layer/a base layer/a balance layer; or a stacked structure of a surface treatment layer/the transparent film layer/a print layer/a white layer/a base layer/a balance layer; or a stacked structure of a surface treatment layer/the transparent film layer/a print layer/a white layer/a base layer/a dimensionally stable layer/a base layer/a balance layer; or a stacked structure of a surface treatment layer/the transparent film layer/a print layer/a white layer/a fiber reinforced base layer/a balance layer.

The flooring may be a floor sheet or a floor tile.

Advantageous Effects

When the above-described transparent film for flooring is applied to the flooring, it is possible to implement a high mechanical strength while reducing TVOCs coming from the bottom. Therefore, the flooring to which the transparent film is applied may have high strength and environmental friendliness.

BEST MODE

Figure 1:
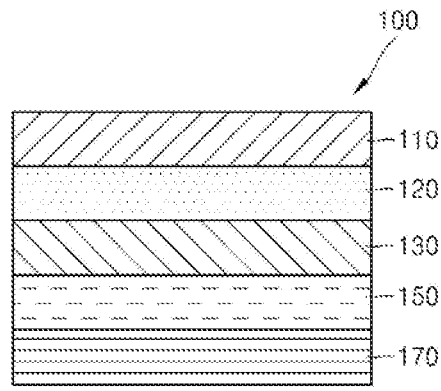
FIG. 1 schematically shows a cross section of an example of flooring according to an exemplary embodiment of the present invention.

The present inventor studied flooring, found that when a transparent film for flooring including a PVC resin and a PMMA resin at a predetermined content ratio was applied as a transparent film layer of the flooring, it was possible to increase strength of the transparent coating layer included in the flooring, and to further block TVOCs coming from the bottom of the transparent coating layer, and completed the present invention.

Hereinafter, exemplary embodiments of the present invention will be described in detail with reference to the accompanying drawings so that those skilled in the art may easily practice the present invention. The present invention may be implemented in various different ways, and is not limited to Examples described herein.

The drawings and description are to be regarded as illustrative in nature and not restrictive. Like reference numerals designate like elements throughout the specification.

In the drawings, the thickness of various layers and regions are exaggerated for clarity. In the drawings, the thickness of layers, films, panels, regions, etc., are exaggerated for clarity.

Hereinafter, formation of any configuration "on (or below)" of a substrate means that any configuration is formed while contacting an upper surface (or a lower surface) of the substrate, and should not be intended to exclude other configurations between the substrate and any configuration formed on (or below) the substrate.

In the conventional flooring, a coating layer is formed on a surface of flooring to improve surface strength, and surface strength is improved by adjusting a thickness, etc., of the coating layer. However, when the thickness of the coating layer is excessively increased, production cost is increased, and the conventional PVC coating layer has a problem in that an emission amount of TVOCs coming from the flooring itself or a bottom thereof is high.

In order to solve the problem, when the above-described transparent film for flooring is applied to the top of the flooring, it is possible to implement high hardness, and thus, excellent surface strength and scratch resistance may be imparted to the flooring and the emission amount of TVOCs coming from the bottom of the flooring may be reduced.

The present invention provides a transparent film for flooring including: a polyvinyl chloride resin; and a polymethyl methacrylate (PMMA) resin.

The polyvinyl chloride resin is obtained by polymerization of vinyl chloride. The polymer has a specific gravity of 1.45, a softening point of 65 to 85° C., and plasticity at 120 to 150° C., and is dissolved at 170° C. or higher. The polyvinyl chloride resin has excellent acid resistance and excellent alkali resistance, and is non-toxic and flame retardant. Further, the polyvinyl chloride resin has good electrical insulation, and is insoluble in alcohols, organic acids, and aliphatic hydrocarbons. The polyvinyl chloride resin is swollen in aromatic hydrocarbons such as benzene and toluene, etc., and is dissolved well in ketones such as cyclohexanone, methylisobutylketone, nitrobenzene, etc. The polyvinyl chloride resin is decomposed when hydrochloric acid is dropped thereon during heating, and is violently decomposed when a temperature is 190° C. or higher.

In order to process with the PVC resin, it is required to be compatible with PVC and to exhibit transparency when mixing. The transparent film for flooring includes the polymethyl methacrylate resin, such that the transparent film for flooring itself may implement excellent hardness, and therefore, flooring to which the transparent film for flooring is applied may have excellent surface hardness and excellent scratch resistance. In addition, the transparent film for flooring including the polymethyl methacrylate resin may be included in the top of the flooring, thereby blocking various TVOCs coming from the bottom of the flooring. In particular, since the transparent film for flooring including the polymethyl methacrylate resin has more excellent compatibility with PVC than those of transparent films for flooring in which other acrylic resins are included, it is possible to implement excellent weatherability and transparency and high hardness. The transparent film for flooring including the PMMA as an acrylic resin may have more excellent processability and may easily implement an effect of improving scratch resistance, thereby achieving an economical effect and improvement of surface strength at the same time.

A weight ratio of the polyvinyl chloride resin to the polymethyl methacrylate resin may be about 20:1 to about 2:1, and specifically, about 15:1 to about 3:1. By mixing the polyvinyl chloride resin with the polymethyl methacrylate resin according to the above-described range of weight ratio, it is possible to adjust hardness of the transparent film to impart appropriate flexibility, thereby achieving excellent processability and improvement of surface strength at the same time. When the transparent film for flooring is applied to the top of the flooring, performance of blocking the TVOCs coming from the bottom of the flooring may be more excellent.

The transparent film for flooring may include about 50 wt % to about 95 wt %, specifically, about 75 wt % to about 85 wt % of the polyvinyl chloride resin. By including the polyvinyl chloride resin within the above-described range of content, the transparent film for flooring may have an appropriate level of flexibility to implement excellent processability.

The transparent film for flooring may include about 0.1 wt % to about 50 wt %, specifically, about 10 wt % to about 30 wt % of the polymethyl methacrylate resin. By including the polymethyl methacrylate resin within the above-described range of content, sufficient surface strength and scratch resistance may be implemented, and at the same time, when the transparent film for flooring is applied to the top of the flooring, the performance of blocking the TVOCs coming from the bottom of the flooring may be more excellent.

The polymethyl methacrylate resin may have a weight average molecular weight (Mw) of about 50,000 g/mol to about 150,000 g/mol, and specifically, about 80,000 g/mol to about 130,000 g/mol. As the polymethyl methacrylate resin has the above-described range of weight average molecular weight, when the transparent film is processed by, for example, extrusion molding, calendering, or blow molding, excellent processability may be implemented, and thus, it is possible to easily realize a desired shape of the flooring, and to prevent a phenomenon that the film adheres to a production apparatus, thereby further reducing a loss rate of raw materials. When the molecular weight is out of the range, it is not preferable since there is a concern that the acrylic resin may not melt at a processing temperature of PVC.

The polymethyl methacrylate resin may have a glass transition temperature of about 85° C. to about 115° C. When the polymethyl methacrylate resin has the above-described range of glass transition temperature, processability of the transparent film layer may be appropriately adjusted together with the polyvinyl chloride resin.

The polymethyl methacrylate resin may have a melt index according to ASTM1238 of about 10 g/10 min to about 25 g/10 min, specifically, about 15 g/10 min to about 25 g/10 min as measured at 230° C. and 3.8 kg. This melt index is a numerical value larger than that of conventional PMMA. When the polymethyl methacrylate resin has the above-described range of melt index, the polymethyl methacrylate resin may have appropriate flexibility, and thus, when the transparent film including the polymethyl methacrylate resin is applied to the flooring, excellent processability may be implemented, and at the same time, when the transparent film is produced by mixing the polymethyl methacrylate resin with the polyvinyl chloride resin, the transparency film may not be excessively soft and may have high hardness.

The transparent film for flooring may further include: at least one selected from the group consisting of a plasticizer, a lubricant, a processing aid, and a combination thereof.

For example, as the plasticizer, a benzoate-based plasticizer, a citrate-based plasticizer, a phosphate-based plasticizer, or the like, may be used to promote environmental friendliness. In addition, the plasticizer may have a content of about 20 parts by weight or less. Accordingly, a bleeding phenomenon of the plasticizer may be further suppressed, and compatibility with other components may be maintained at an excellent level, and thus, it is possible to easily implement desired physical properties.

The lubricant is not particularly limited in view of a kind, but the lubricant may include an environmentally friendly higher fatty acid to promote environmental friendliness, and specifically, may include stearic acid which is a saturated higher fatty acid having 18 carbon atoms. Further, the lubricant may have a content of about 3 parts by weight or less, and therefore it is possible to effectively prevent the resin from adhering to a calender roll or a press during a process of calendering or pressing for forming the transparent film.

The transparent film may further include other additives, etc., and the other additives may be various kinds of materials known in the art, and are not particularly limited.

Further, the transparent film may have a thickness of about 0.05 mm to about 1.5 mm, and preferably about 0.07 mm to about 0.75 mm. When the transparent film has the thickness within the above-described range, it is possible to appropriately block the TVOCs coming from the flooring including the transparent film on the top without excessively increasing the thickness of the transparent film, and to protect printing of a printing layer stacked below the transparent film layer and at the same time, to impart high rigidity, and thus, excellent surface hardness and scratch resistance may be implemented.

The present invention provides flooring including: a transparent film layer formed of the transparent film for flooring as described above. By including the transparent film layer, the flooring may implement high strength properties such as surface hardness, scratch resistance, etc., while simultaneously reducing the emission amount of TVOCs.

Further, the flooring may further include at least one layer selected from the group consisting of a surface treatment layer, a print layer, a dimensionally stable layer, a white layer, a base layer, a balance layer, and a combination thereof.

Figure 3:
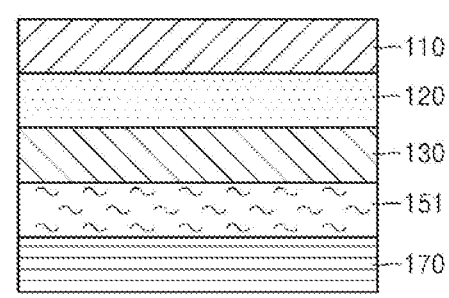
FIG. 3 schematically shows a cross section of an example of flooring according to still another exemplary embodiment of the present invention.

Specifically, the base layer may be a fiber reinforced base layer. A cross-section of the flooring including the fiber reinforced base layer is schematically shown in FIG. 3.

A fiber reinforcing agent used in the fiber reinforcing base layer may be one selected from the group consisting of inorganic materials such as a glass fiber, organic materials such as an aramid fiber, nylon and polyester, natural materials such as wood fiber, and a combination thereof.

For example, the flooring may have a stacked structure of the transparent film layer/a print layer/a white layer/a base layer; or a stacked structure of a surface treatment layer/the transparent film layer/a print layer/a white layer/a base layer; or a stacked structure of the transparent film layer/a print layer/a white layer/a base layer/a balance layer; or a stacked structure of a surface treatment layer/the transparent film layer/a print layer/a white layer/a base layer/a balance layer; or a stacked structure of a surface treatment layer/the transparent film layer/a print layer/a white layer/a base layer/a dimensionally stable layer/a base layer/a balance layer; or a stacked structure of a surface treatment layer/the transparent film layer/a print layer/a white layer/a fiber reinforced base layer/a balance layer.

The surface treatment layer, the transparent film layer, the print layer, the white layer, the base layer, the dimensionally stable layer, and the balance layer may further include a plasticizer, a melt strength reinforcing agent, a lubricant, etc. Contents thereof may be appropriately adjusted according to properties and functions of the respective layers, and are not particularly limited.

The surface treatment layer may improve stain resistance of the flooring to facilitate cleaning. For example, the surface treatment layer may be formed by applying a general UV curable composition such as a urethane acrylate-based UV curable composition on the transparent film layer, followed by UV irradiation, but the formation of the surface treatment layer is not limited thereto. The surface treatment layer may have a thickness of about 0.01 mm to about 0.1 mm, but the thickness thereof is not limited thereto.

The above-described transparent film layer is the transparent film layer for flooring of the present invention, and is the same as described above.

The print layer may be formed by imparting patterns to a surface of the white layer stacked on bottom by various methods such as transfer printing, gravure printing, screen printing, offset printing, rotary printing, flexographic printing, etc., and may provide an aesthetic property to the flooring. The print layer may have a thickness of, for example, about 0.01 mm to about 0.3 mm. When the print layer has a thickness of less than about 0.01 mm, printing may be difficult to be performed. When the print layer has a thickness of more than about 0.3 mm, the production cost of the flooring may be increased.

The white layer is a layer having a white color, and may allow to clearly exhibit designs or patterns of the print layer, and may improve adhesion force between the print layer stacked on the top and the base layer stacked on the bottom, thereby implementing excellent durability.

The base layer is the most basic layer of the flooring, and supports the transparent layer on the top and the print layer, and absorbs impact of the top and bottom. The base layer may have a thickness of, for example, about 1.0 mm to about 5.0 mm. When the base layer has a thickness of about 1.0 mm or less, the above functions may not be performed properly. When the base layer has a thickness of about 5.0 mm or more, the production cost for producing the flooring may be increased.

The balance layer is a part to be adhered to a bottom surface during construction, and protects a back surface opposite to the surface of the flooring. The balance layer serves to prevent moisture from the bottom, and may have a thickness of about 0.10 mm to about 2.0 mm, but the thickness thereof is not limited thereto.

The white layer, the base layer, the balance layer, or all of these layers may further include at least one selected from the group consisting of titanium dioxide, calcium carbonate, wood powder, mica, glass fiber, starch, natural fiber, rice husk, pine resin, talc, and a combination thereof.

The dimensionally stable layer may impart dimensional stability according to change in temperature. The dimensionally stable layer may include a glass fiber. Specifically, the dimensionally stable layer may be formed by appropriately mixing a glass fiber, pulp, and a binder to be produced into a sheet form, and impregnating the sheet with a vinyl chloride sol, followed by gelling to form a sheet.

The flooring may be formed by producing the respective layers into a film form or a sheet form using, for example, extrusion molding, calendering, blow molding, or the like, and applying heat and pressure on the layers to be stacked by using lamination processes, etc., that are known in the art, but the formation of the flooring is not limited thereto.

The flooring may be, for example, a floor sheet or a floor tile, and specifically, may be a floor tile.

In the bottom sheet, it may be more important to have relatively large flexibility and to prevent whitening rather than durability. However, in the bottom tile, it may be more important to have relatively small flexibility and have durability rather than prevention of whitening.

Hereinafter, preferred embodiments of the present invention will be described. It is to be noted that Examples to be described below are provided merely for specifically exemplifying the present invention, and accordingly, the present invention is not limited to the following Examples. Descriptions which are not described in the specification can be sufficiently and technically deduced by a person skilled in the art, and accordingly, details thereof will be omitted.

EXAMPLE

Example 1

(Production of Transparent Film)

A composition including 61.35 wt % of a polyvinyl chloride resin, 16.56 wt % of a polymethyl methacrylate (PMMA) resin, 19.02 wt % of a plasticizer, 1.23 wt % of a stabilizer, and 1.84 wt % of an additive was kneaded in a Banbury mixer at a temperature of 160° C., followed by primary and secondary mixing using a 2 roll mixer. Then, the produced raw material was subjected to a calendering process at a temperature of 150° C. to produce a transparent film having a thickness of 0.15 mm.

(Production of Print Layer and White Layer)

25 parts by weight of DOTP, 3 parts by weight of a heat stabilizer, and 20 parts by weight of titanium dioxide with respect to 100 parts by weight of the polyvinyl chloride resin were kneaded in a Banbury mixer at a temperature of 160° C. for 5 minutes, followed by primary and secondary mixing using a 2 roll mixer. Then, the produced raw material was subjected to a calendering process at a temperature of 170° C. to produce a transparent film having a thickness of 0.10 mm.

Further, patterns were formed on a surface of the white sheet through a gravure printing method or a transfer printing method, thereby producing a print layer having a thickness of 0.10 mm.

(Production of Base Layer)

40 parts by weight of DOTP, 600 parts by weight of a calcite, and 5 parts by weight of a processing aid with respect to 100 parts by weight of the polyvinyl chloride resin were kneaded in a Banbury mixer at a temperature of 180° C. for 5 minutes, followed by primary and secondary mixing using a 2 roll mixer. Then, the produced raw material was subjected to a calendering process at a temperature of 150° C. to produce a base layer having a thickness of 2.6 mm.

(Production of Balance Layer)

25 parts by weight of DOTP, 120 parts by weight of a calcite, and 3 parts by weight of a heat stabilizer with respect to 100 parts by weight of the polyvinyl chloride resin were kneaded in a Banbury mixer at a temperature of 160° C. for 5 minutes, followed by primary and secondary mixing using a 2 roll mixer. Then, the produced raw material was subjected to a calendering process at a temperature of 150° C. to produce a balance layer having a thickness of 0.15 mm.

The transparent film layer including the transparent film, the print layer, the white layer, the base layer, and the balance layer as prepared above were sequentially stacked and laminated by applying a pressure of 1 kgf/cm$^2$ at a temperature of 150° C. using a press apparatus for 3 minutes, and thus, flooring was produced. A cross section of the above flooring according to Example 1 was schematically shown in FIG. 1.

Example 2

(Production of Dimensionally Stable Layer)

100 parts by weight of an acrylic resin, 60 parts by weight of ATBC, 15 parts by weight of a viscosity reducing agent, 50 parts by weight of calcium carbonate, and 5 parts by weight of titanium dioxide were mixed to produce an acrylic sol. Then, the acrylic sol produced using a roll coater was impregnated with a glass fiber (60 g/m$^2$) and dried at 180° C. for 3 minutes to produce a dimensionally stable layer having a thickness of 0.4 mm.

Figure 2:
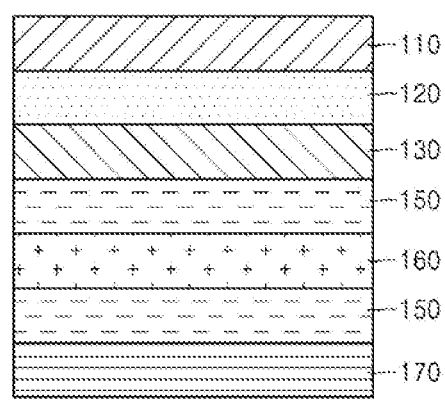
FIG. 2 schematically shows a cross section of an example of flooring according to another exemplary embodiment of the present invention.

The transparent film layer including the transparent film, the print layer, the white layer, and the base layer as prepared in Example 1 above were sequentially stacked, and the dimensionally stable layer, the base layer, and the balance layer were sequentially stacked. These layers were then laminated by applying a pressure of 1 kgf/cm$^2$ at a temperature of 150° C. using a press apparatus for 3 minutes, and thus, flooring was produced. A cross section of the above flooring according to Example 2 was schematically shown in FIG. 2.

Example 3

Flooring was produced in the same manner as in Example 1, except that 65.64 wt % of a polyvinyl chloride resin and 12.27 wt % of a polymethyl methacrylate (PMMA) resin were used in the production of the transparent film layer.

Example 4

Flooring was produced in the same manner as in Example 1, except that 46.75 wt % of a polyvinyl chloride resin and 31.16 wt % of a polymethyl methacrylate (PMMA) resin were used in the production of the transparent film layer.

Comparative Example 1

Flooring was produced in the same manner as in Example 1, except that a polyhydroxyalkanoate (PHA) resin was included instead of the polymethyl methacrylate (PMMA) resin in the production of the transparent film layer.

Comparative Example 2

Flooring was produced in the same manner as in Example 1, except that the polymethyl methacrylate (PMMA) resin was not included at all in the production of the transparent film layer.

Experimental Example

The floorings of Examples and Comparative Examples were cut into a size of 20 mm×20 mm×3 mm (width× length×thickness). Then, TVOCs (mg/m²·h), film hardness (shore D hardness), film abrasion strength, and scratch resistance were measured according to the following methods, and results thereof are shown in Table 1 below.

1. Measurement of Emission Amount of Tvocs

A content of TVOCs was measured by a small chamber method.

2. Measurement of Film Hardness

The film hardness was measured by a rubber shore D hardness tester.

3. Measurement of Film Abrasion Strength

A film abrasion strength was determined by measuring the number of times the film is abraded by using H-18 abrasive wheel (abrasive description: medium-coarse) (manufactured by Taber).

4. Measurement of Scratch Resistance

Scratch resistance of the film was determined by measuring force at which scratches of the film occurred, using a 0.5 mm tip of an Erichsen Scratch Tester (ISO 4586-2/DIN EN 438-2).

TABLE 1

| | TVOCs (mg/m²·h) | Film Hardness (Shore D Hardness) | Film Abrasion Intensity-H-18 Abrasive Wheel-Number of times film is abraded | Scratch Resistance |
|---|---|---|---|---|
| Example 1 | 0.120 | 72 | 6,700 | 10 N |
| Example 2 | 0.125 | 72 | 6,650 | 10 N |
| Example 3 | 0.130 | 70 | 6.500 | 9 N |
| Example 4 | 0.120 | 80 | 6,000 | 12 N |
| Comparative Example 1 | 0.203 | 54 | 5,800 | 7 N |
| Comparative Example 2 | 0.327 | 57 | 6,300 | 8 N |

As shown in Table 1, it was confirmed that the emission amounts of TVOCs in Examples 1 to 4 were lower than those of Comparative Examples. Meanwhile, in Example 4 in which the weight ratio of the PVC resin to the PMMA resin was about 1.5:1, it was confirmed that the film hardness and scratch resistance thereof were equal to or higher than those of other Examples 1 to 3, but the film abrasion strength was poor. In Comparative Examples 1 and 2 that included PHA instead of PMMA or that did not include PMMA at all, it was confirmed that an effect of blocking TVOCs was not significant and the strength of the film was lowered. It could be appreciated that in the flooring to which the transparent film for flooring according to the present invention was applied, the effect of blocking TVOCs was excellent, and at the same time, excellent strength was implemented.

The invention claimed is:

1. A transparent film for flooring comprising:
   a polyvinyl chloride resin, wherein an amount of the polyvinyl chloride resin ranges from 61.35 wt % to 65.64 wt % based on a total amount of the transparent film; and
   a polymethyl methacrylate (PMMA) resin, wherein a melt index of the PMMA resin according to ASTM1238 ranges from 10 g/10 min to 25 g/10 min, and an amount of the PMMA resin ranges from 12.27 wt % to 16.56 wt % based on a weight of the transparent film,
   wherein a weight ratio between the polyvinyl chloride resin and the polymethyl methacrylate (PMMA) resin ranges from about 15:1 to about 3:1.

2. The transparent film for flooring of claim 1, wherein the polymethyl methacrylate resin has a weight average molecular weight (Mw) of 50,000 g/mol to 150,000 g/mol.

3. The transparent film for flooring of claim 1, wherein the polymethyl methacrylate resin has a glass transition temperature of 85° C. to 115° C.

4. The transparent film for flooring of claim 1, further comprising:
   at least one selected from the group consisting of a plasticizer, a lubricant, a processing aid, and a combination thereof.

5. The transparent film for flooring of claim 1, wherein the transparent film has a thickness of 0.05 mm to 1.5 mm.

6. A flooring comprising: a transparent film layer; a print layer; a white layer; and a base layer sequentially stacked,
   wherein the transparent film layer comprises a transparent film, and the transparent film comprises:
   a polyvinyl chloride resin, wherein an amount of the polyvinyl chloride resin ranges from 61.35 wt % to 65.64 wt % based on a total amount of the transparent film; and
   a polymethyl methacrylate (PMMA) resin, wherein a melt index of the PMMA resin according to ASTM1238 ranges from 10 g/10 min to 25 g/10 min, and an amount of the PMMA resin ranges from 12.27 wt % to 16.56 wt % based on a weight of the transparent film,
   wherein a weight ratio between the polyvinyl chloride resin and the polymethyl methacrylate (PMMA) resin ranges from about 15:1 to about 3:1.

7. The flooring of claim 6, further comprising:
   at least one layer selected from the group consisting of a surface treatment layer, a dimensionally stable layer, and a balance layer.

8. The flooring of claim 6, wherein the base layer is a fiber reinforced base layer.

9. The flooring of claim 6, wherein the flooring is a floor sheet or a floor tile.

* * * * *